United States Patent [19]

Kaupp

[11] 3,998,536

[45] Dec. 21, 1976

[54] APPARATUS FOR ELECTROSTATIC PAPER STRIPPING

[75] Inventor: Norbett H. Kaupp, Newark, N.Y.

[73] Assignee: Xerox Corporation, Stamford, Conn.

[22] Filed: Nov. 18, 1971

[21] Appl. No.: 200,253

Related U.S. Application Data

[60] Division of Ser. No. 41,668, May 20, 1970, abandoned, which is a continuation of Ser. No. 585,816, Oct. 11, 1966, abandoned.

[52] U.S. Cl. .................................. 355/3 R; 96/1 C

[51] Int. Cl.[2] .......................................... G03B 15/22

[58] Field of Search .......................... 96/1, 1.4, 1 C; 101/426, 1; 355/3 R, 3 TR, 3 TE; 250/324, 325, 326

[56] References Cited

UNITED STATES PATENTS

| | | | |
|---|---|---|---|
| 2,576,882 | 11/1951 | Koole et al. | 198/1 |
| 3,076,092 | 1/1963 | Mott | 355/3 CH X |
| 3,124,457 | 3/1964 | Schwertz | 96/1 |
| 3,147,679 | 9/1964 | Schaffert | 355/3 |
| 3,190,198 | 6/1965 | Eichorn | 355/3 R |
| 3,244,083 | 4/1966 | Gundlach | 355/3 TR |

*Primary Examiner*—Edna M. O'Connor

[57] ABSTRACT

Apparatus for stripping copy sheets, which are electrostatically supporting toner images, away from an original support surface (from which the toner images have been transferred to the copy sheets). The stripping is achieved through the neutralization of the electrostatic charge in the copy sheets which holds them to the surface.

8 Claims, 1 Drawing Figure

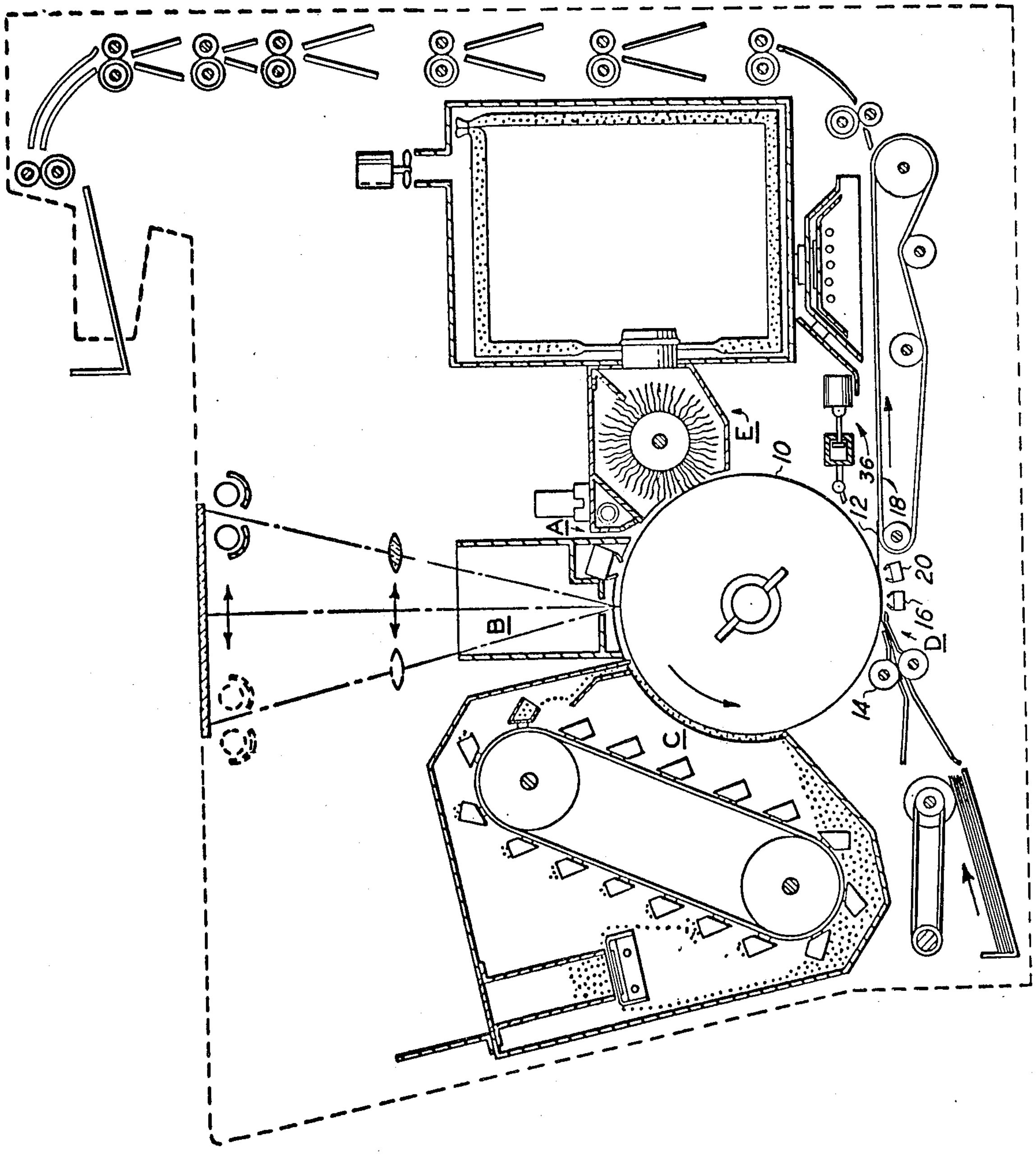
INVENTOR
NORBETT H. KAUPP
BY

APPARATUS FOR ELECTROSTATIC PAPER STRIPPING

The Application Ser. No. 41,668, filed May 20, 1970, now abandoned of which this is a division, which is a continuation of Application Ser. No. 585,816, filed Oct. 11, 1966, and now abandoned. Application Ser. No. 433,971, filed Jan. 15, 1974, and now allowed, is a continuation of Ser. No. 41,668, which is now abandoned.

This invention relates to xerography and in particular to a method and apparatus for stripping copy with transferred toner images from a xerographic surface.

In the practice of xerography, as described for example in U.S. Pat. No 2,297,691, to Chester F. Carlson, a xerographic surface comprising a layer of photoconductive insulating material affixed to a conductive backing is used to support latent electrostatic images. In the usual method of carrying out the process, the xerographic plate is electrostatically charged uniformly over its surface and then exposed to a light pattern of the image being reproduced to thereby discharge the charge in the areas where light strikes the layer. The undischarged areas of the layer thus form an electrostatic charge pattern in conformity with the configuration of the original light pattern.

The latent electrostatic image can then be developed by contacting it with a finely divided electrostatically attractable material such as a powder. The powder is held in image areas by the electrostatic charge on the layer. Where the charge is greatest, the greatest amount of material is deposited; and where the charge is least, little or no material is deposited. Thus, a powdered image is produced in conformity with a light image of the copy being reproduced. The powder is subsequently transferred to a sheet of paper or other surface and suitably affixed thereto to form a permanent print.

The electrostatically attractable developing material commonly used in xerography comprises a pigmented resinous powder referred herein to as "toner" and a coarse granular material called "carrier". The carrier is coated with a material removed in the triboelectric series from the toner so that a charge is generated between the powder and the granular carrier upon mutual interaction. Such charge causes the powder to adhere to the carrier. The carrier, besides providing a charge to the toner, permits mechanical control so that the toner can readily be brought into contact with the exposed xerographic surface for the development of the surface. The powder particles are attracted to the electrostatic image from the granular material to produce a visible powdered image on the xerographic surface.

When xerography is practiced on a cylindrically shaped endless xerographic surface, as a drum described for example in U.S. Pat. No. 3,062,536, to J. Rutkus, Jr., et al, the final copy paper is caused to move in synchronous contact with the drum during a portion of the rotation of the drum. During this time, a potential opposite from the polarity on the toner is applied to the side of the paper remote from the drum to electrostatically attract the toner image from the drum to the copy paper. A puff of air or other mechanical means may then be employed to separate the image bearing paper from the drum. The toner image is then fused to the paper for the production of the final xerographic copy.

During the transfer of the toner image from the drum to the paper, the transfer corotron, which is of a positive polarity when negatively charged toner is applied, deposits a positive charge on the copy paper. The copy paper which is an insulator retains the positive charge while inducing a negative charge in the non-image area of the xerographic drum. This new charge orientation creates an electrostatic bond between the paper and drum.

To separate the paper from the drum, the electrostatic bond therebetween must first be overcome either mechanically or electrostatically. When an air puffer is used to achieve this separation, a relatively high pressure of air must be employed to overcome the attraction of the paper for the drum. However, when high air pressures are employed, there is a tendency of such air to agitate the unfused toner image on the paper and disrupt the image configuration of the toner. This exhibits itself as puffer smears on the final copy. This blowing of toner powder also results in mechanical dirt problems throughout the functioning elements of the system. Furthermore, when a copy is being separated from the xerographic surface, the high pressure of air repels the toner-bearing paper against the output conveyor with a toner-jarring force epecially when the electrostatic bond is small. Mechanical fingers have also been employed to effect stripping. Mechanical fingers, however, have a tendency to scratch and abrade the xerographic surface.

The present invention is directed to a method and apparatus for electrostatically stripping copy from a xerographic surface by neutralizing the electrostatic bond between the paper and xerographic surface. This permits xerographic stripping to be practiced without mechanical instrumentalities.

It is, therefore, an object of the instant invention to strip image-bearing xerographic copy from a xerographic surface electrostatically.

It is another object of the invention to remove the electrostatic charges from xerographic copy.

It is another object of the invention to neutralize the electrostatic bond between xerographic copy and a xerographic surface to cause their separation.

It is a further object of the invention to eliminate toner smears, toner dust contamination, drum abrasion, and other deleterious effects caused by the mechanical removal of image-bearing copy from a xerographic surface.

These and other objects of the invention are achieved by neutralizing the electrostatic bond which holds xerographic copy to xerographic surfaces after an electrostatic transfer. This neutralization is accomplished by the use of detacking corona emissions sprayed on the face of the image bearing copy sheet remote from the xerographic surface.

For a better understanding of the invention, as well as other objects and further features thereof, reference is had to the following detailed description of the invention to be read in connection with the accompanying drawing wherein the FIGURE is a schematic diagram of an automatic xerographic reproducing machine utilizing the principles of the instant invention.

Referring now to the FIGURE, there is shown an embodiment of the subject invention in a suitable environment such as an automatic xerographic reproducing machine. The machine has a xerographic surface 10 formed by a photoconductive layer on a conductive backing. The surface is formed in the shape of a drum which is mounted on a shaft journaled in the frame of the machine to rotate in a direction as indicated by the arrow. This movement causes the drum surface to move sequentially past a plurality of xerographic processing stations.

For the purpose of the present disclosure, the several xerographic processing stations in the path of movement of the drum surface may be described functionally, as follows:

A charging station A, at which a uniform electrostatic charge is deposited on the photoconductive layer of the xerographic drum;

An exposure station B, at which a light or radiation pattern of a copy to be reproduced is projected onto the drum surface to dissipate the drum charge in the exposed areas thereof thereby forming a latent electrostatic image of the copy to be reproduced;

A development station C, at which the xerographic developing material including toner particles having an electrostatic charge opposite to that of the latent electrostatic image, are cascaded over the drum surface, whereby the toner particles adhere to the latent electrostatic image to form a xerographic powder image in the configuration of the copy being reproduced;

A transfer station D, at which the xerographic powder image is electrostatically transferred from the drum surface to a transfer or support material and then removed from the drum for fusing the image onto the support material; and, A drum cleaning and discharge station E, at which the drum surface is brushed to remove residual toner particles remaining thereon after image transfer, and at which the drum surface is exposed to a relatively bright light source to effect substantially complete discharge of any residual electrostatic charge remaining thereon.

It is believed that the foregoing description is sufficient for the purposes of this application to show the general operation of the xerographic reproducing apparatus.

As the drum shaped surface rotates past the development station C, a suitable backing material 12 such as paper is brought into contact with the xerographic surface 10 by first sheet feeding mechanisms 14. Other insulating backing materials, such as Mylar or the like, may also be used. The sheet and drum then move at the same linear speed past a transfer corotron 16 which acts to electrostatically draw the toner image from the drum towards the paper. At the same time, however, the electrostatic charge emitted by the transfer corotron electrostatically tacks the paper to the drum. The drum and paper then travel together to suitable instrumentalities capable of removing the paper from the drum to thereby allow the toner-bearing paper to be transported away by second sheet feeding mechanisms 18. The second sheet feeding mechanisms transport the toner-bearing paper to a fusing station for the production of the final copy.

Most known machines of this type employ some sort of mechanical instrumentalities to strip the image-bearing paper from the xerographic drums. The puffer, which propels a jet of air or other aeriform fluid between the paper and drum, is probably the most common means used for stripping. A description of a puffer may be found in the aforementioned Rutkus patent, which patent also more fully describes the other xerographic processing stations referred to above.

The instant invention requires no puffer or other mechanical stripping mechanisms. In place thereof, a stripping corotron 20 is positioned across the xerographic drum downstream from the transfer corotron. The stripping corotron is adapted to subject the face of the toner-bearing paper remote from the drum and toner image to a spray of ions having a net polarity opposite from that of the transfer corotron. The purpose of the ion spray of the stripping corotron is to neutralize the bond causing charges placed in the copy paper by the transfer corotron. By neutralizing this charge, the bond between the paper and drum is removed and the stripping of the paper can be achieved by the pull of gravity on the paper and the resiliency of the paper which makes it return to its original unbent state.

For the purposes of this illustrative example, let us assume that the original charge placed on the photoconductor is positive and that negative toner particles are used to develop the image. In such case a transfer corotron 16 with a positive DC output greater in magnitude than the image charges on the xerographic surface will attract the toner particles from the xerographic surface to the copy paper to cause the transfer of the image. Such positive emissions as caused by the transfer corotron 16 also tend to build up a uniform positive charge per unit area on the insulating copy paper. The transfer emissions accepted by the paper in regions overlying the non-image areas of the photoconductor induce an opposite or negative charge in the conductive substrate portion of the xerographic drum in non-image areas. This charge distribution in non-image areas of the drum and paper creates an electrostatic attraction therebetween.

The elimination or neutralization of the electrostatic bond between the paper and drum can be achieved by eliminating or neutralizing the forces creating the bond. Where the positive transfer emissions remaining in the paper create the bond, equal and opposite negative emissions can remove them.

The bond between the paper and drum consists of charges having a constant charge per unit area. It has been determined that the bond causing the charge on the copy paper can be neutralized through the use of an AC corotron which produces an excess of emissions opposite in polarity from the charge in the paper. Such an AC emission can be achieved through the proper selection of the corotron wire and bias. The selected corotron used for successful detacking of paper traveling at 7.1 inches per second according to the instant invention includes 3.5 mil platinum-iridium wire with a 4,500 RMS volt AC source at 600 CPS with a positive 850 volt DC bias. The wire material and the diameter as well as the DC bias permits the production of the required excess of negative emissions. Although both positive and negative ions are emitted, the excess of negative ions will produce the required net negative effect.

The parameters of the above described corona source are by way of illustration only, and the invention is operable over an extremely wide range of parameters. The detacking corotron described above was used with the machine of the above referred to Rutkus patent. The paper employed varied from heavier than normal 110 pound paper down to tissue type 13 pound paper with no variation in the effectiveness of the stripping. The wide range of paper weights usable to practice the invention was considered significent. Paper has an inherent tendency to straighten itself out after being bent, as when moved through an arc of the drum surface during transfer. Even the lightest and most flexible papers tested, when neutralized by the stripping emissions, had the ability to fall from the drum under their own weight and resiliency. Furthermore, the neutralizing effect allowed successful stripping of line copy as well as solid area copy with no readjustments of the stripping corotron and rendered the stripped paper free from virtually all static charges for easy handling thereafter.

Pure DC emissions, equal and opposite from the charge in the paper, have also been found capable of eliminating this paper-to-drum bond. An ion flow from a DC source, large enough to minimize the bond but just slightly lower than the potential which would repel the toner back onto the drum, was also successfully used. Such an emission source included at 3.5 mil platinum-iridium corotron wire with a negative DC bias to provide a current of 2 microamps per inch when run on the machine of the above referred to Rutkus patent. However, the critical parameters to which such a DC corotron must be held makes the AC corotron more economically feasible. Such parameters include uniformity of cross-sectional diameter of the corotron wire, uniformity of wire material, uniformity of speed between the corotron and image as well as uniformity of input current to the corotron. It was not found necessary to hold the AC embodiment to such critical parameters.

While the instant invention has been described as being carried out on a drum-shaped xerographic surface in an automatic and continuous machine, it should be realized that the invention is equally applicable to other xerographic machines, as for example, ones employing continuous belt-shaped xerographic surfaces. In such case, the stripping would preferably take place at a location where the belt was being guided around a roller.

In operation, as developed xerographic images on the drum-shaped surface 10 move beyond the development station C, the drum contains residual charges in non-image areas and higher charges in image areas. The image areas also have charged toner particles in an image-wise configuration corresponding to the object to be reproduced. The drum with its toner images, then passes to a point just before the transfer corotron 16 at which point a sheet of copy paper contacts the drum for concurrent movement therewith. Passage of the paper and image bearing xerographic surface beneath the first or transfer corotron 16 acts to produce an ion flow opposite in polarity from the charge on the toner to thereby electrostatically transfer the toner image from the drum to the paper and to electrostatically tack the paper to the drum. Continued movement of the paper with the drum past a second or detacking corotron 20 neutralizes the charges in the paper caused by the transfer corotron to release the electrostatic bond which has been holding the paper to the drum. The weight of the paper, along with its tendency to straighten itself out, then cause the paper to fall from the drum onto a second sheet feeding mechanism 18. The second sheet feeding mechanism 18 conveys the paper from the drum area to a fusing station for the creation of the final permanent copy.

The stripping corotron has an extended utility in that it is usable to decrease the electrostatic bond between the copy and drum to a less than copy stripping amount. In such case a mechanical stripper, such as a puffer, would be used in combination with the bond decreasing corotron to effect the final removal of the copy from the drum. Greatly reduced puffing pressure, however, would be needed and many of the problems caused by puffing would be minimized.

It is obvious that the stripping corotron needed to carry out the instant invention is readily adapted for incorporation into existing commerical xerographic machines. It is also usable for making fused and unfused masters as well as conventional xerographic copy. The various polarities described are also illustrative since they could obviously be varied by one skilled in the art to effect the same paper stripping ability, as for example, in the stripping of positive copy made from negative optical originals.

While the present invention, as to its objects and advantages, has been described herein as carried out in specific embodiments thereof, it is not desired to be limited thereby; but it is intended to cover the invention broadly within the spirit and scope of the appended claims.

What is claimed is:

1. Electrophotographic copying arrangement comprising, in combination, transporting means having a movable surface; means for forming on said surface a latent image; developing means for applying a powder to said latent image to form a powder image on said surface; means for feeding a chargeable copy carrier to said surface in the region of said powder image; a transfer charging device emitting a first ion stream toward said copy carrier for charging said copy carrier with a first charge having a first polarity so that said powder image is transferred to said charged copy carrier and an electrostatic force attracts said charged copy carrier to said surface; and a compensating charging device emitting a second ion stream toward said copy carrier for charging said charged copy carrier during passage of said compensating charging device by said copy carrier with a second charge having a second polarity opposite to said first polarity and being substantially equal to said first charge produced by said first ion stream during passage of said transfer charging device by said copy carrier for at least substantially neutralizing said first charge so that said copy carrier does not adhere to said surface of said transporting means.

2. Electrophotographic copying arrangement comprising, in combination, transporting means including a rotary cylinder having a peripheral surface moving in one direction; means for forming on said surface a latent image; developing means for applying a powder to said latent image to form a powder image on said surface; means for feeding chargeable copy carrier to said surface; a transfer charging device for charging said copy carrier with a first charge having a first polarity, said feeding means feeding said copy carrier to said surface in the region of said transfer charging device so that said powder image is transferred to said charged copy carrier and an electrostatic force attracts said charged copy carrier to said surface; a compensating charging device disposed following said transfer charging device in said one direction for charging said charged copy carrier with a second charge having a second polarity opposite to said first polarity for at least substantially neutralizing said first charge so that said copy carrier does not adhere to said surface of said transporting means; and blower means for blowing low pressure stream of air toward the leading edge of said copy carrier and past said compensating charging device.

3. Electrophotographic copying arrangement comprising, in combination, transporting means having a movable surface; means for forming on said surface a latent image; developing means for applying a powder to said latent image to form a powder image on said surface; means for feeding a chargeable copy carrier to said surface; a transfer charging device for charging said copy carrier with a first charge having a first polarity, said feeding means feeding said copy carrier to said surface in the region of said transfer charging device so that said powder image is transferred to said charged copy carrier and an electrostatic force attracts said charged copy carrier to said surface; and a compensating charging device for charging said charged copy carrier with a second charge having a second polarity opposite to said first polarity for at least substantially neutralizing said first charge so that said copy carrier does not adhere to said surface of said transporting means; and blower means for blowing a low pressure stream of air toward the copy carrier on said surface for separating the same from said surface.

4. Copying apparatus comprising an imaging surface having a cylindrical configuration in at least one area and developing means for developing the imaging surface with charged toner particles and transfer means for electrostatically transferring the toner particles to individual resilient, self-straightening backing sheets, wherein said transfer means also electrostatically bonds the backing sheet to the imaging surface by applying electrical charges of a first polarity to the backing sheet, the improvement comprising:

stripping means for subsequently decreasing said electrostatic bonding between the backing sheet and the imaging surface sufficiently to cause stripping of the toner-bearing backing sheet from the imaging surface, wherein said stripping means for decreasing said electrostatic bonding comprises corona means for applying to the backing sheet corona emissions having a net second polarity opposite from the first polarity charges on the backing sheet, said emissions being sufficient to minimize said electrostatic bonding but insufficient to retransfer the toner particles back onto the imaging surface;

and wherein said stripping means is located adjacent a cylindrical area of said imaging surface and causes the backing sheet to separate from said imaging surface where said imaging surface is cylindrical by the self-straightening resiliency of the backing sheet.

5. The apparatus of claim 4, wherein said corona means for applying corona emissions of the second polarity is an A.C. corona generator.

6. An electrophotographic copying arrangement comprising, in combination, transporting means including a rotary cylinder and having a peripheral imaging surface moving in one direction;

means for forming on said surface a latent image;

developing means for applying a powder to said latent image to form a powder image on said surface;

means for feeding individual chargeable copy carrier sheets to said surface;

a transfer device charging said copy carrier sheet with a first charge having a first polarity;

said feeding means feeding said copy carrier sheet to said surface in the region of said transfer device so that said powder image is transferred to said charged copy carrier sheet and an electrostatic force attracts said charged copy carrier sheet to said surface; and a compensating charging device disposed following said transfer device in said one direction for charging said charged copy carrier sheet with a second charge having a second polarity opposite to said first polarity for at least substantially neutralizing said first charge so that said copy carrier sheet does not adhere to said imaging surface of said transporting means.

7. The electrophotographic copying arrangement of claim 6, wherein said compensating charging device is an A.C. corona generator.

8. Copying apparatus comprising an imaging surface having a cylindrical configuration in at least one area and developing means for developing the imaging surface with toner particles and transfer means for electrostatically transferring the toner particles from the imaging surface to individual self-straightening backing sheets, wherein said transfer means also electrostatically adheres the backing sheets to the imaging surface by applying electrical charges of a first polarity to the backing sheets, the improvement comprising:

stripping means for substantially decreasing said electrostatic adhesion between the backing sheets and the imaging surface so that the toner-bearing backing sheets do not adhere to the imaging surface, wherein said stripping means for decreasing said electrostatic adhesion comprises alternating current corona means adjacent said imaging surface for applying to the backing sheets alternating current corona emissions providing a net second polarity opposite from the first polarity charges applied to the backing sheets by said transfer means.

* * * * *

Disclaimer 3,998,536.—*Norbett H. Kaupp,* Neward, N.Y. APPARATUS FOR ELECTROSTATIC PAPER STRIPPING. Patent dated Dec. 21, 1976. Disclaimer filed May 4, 1984, by the assignee, *Xerox Corp.*

Hereby enters this disclaimer to claims 1, 6, 7 and 8 of said patent.

[*Official Gazette December 25, 1984.*]